METHOD OF MAKING MEMORY PLANES

Original Filed July 8, 1969 2 Sheets-Sheet 1

INVENTORS
PETER L. MORAWETZ
MERYL W. TINKLENBERG
ROGER A. OLSON

BY Stryker & Jacobson
ATTORNEYS

METHOD OF MAKING MEMORY PLANES

Original Filed July 8, 1969 2 Sheets-Sheet 2

INVENTORS
PETER L. MORAWETZ
MERYL W. TINKLENBERG
ROGER A. OLSON

BY Stryker & Jacobson

ATTORNEYS

1

3,764,486

METHOD OF MAKING MEMORY PLANES

Meryl W. Tinklenberg, St. Paul, and Peter L. Morawetz, Minneapolis, Minn., and Roger A. Olson, Amery, Wis., assignors to Buckbee-Mears Company, St. Paul, Minn.

Original application July 8, 1969, Ser. No. 839,917, now abandoned. Divided and this application Jan. 3, 1972, Ser. No. 215,226
Int. Cl. C23b *7/02, 5/48*
U.S. Cl. 204—12 5 Claims

ABSTRACT OF THE DISCLOSURE

A method of electrodeposition and selective etching to produce a set of digit lines suitable for use in a magnetic memory device.

This is a division of application Ser. No. 839,917, filed July 8, 1969 and now abandoned.

BACKGROUND OF THE INVENTION

Field of the invention

This invention relates generally to the art of producing magnetic memory devices and, more specifically, to a process of electrodeposition and selective etching to produce compact magnetic memory devices.

Description of the prior art

In extensive in today's digital computers are magnetic memory units that are made by inserting a set of plated wires through a set of plastic tubes. With computer memory units being required to contain more bits of information as well as being made more compact, there is a definite need for miniaturization of the digit lines and word lines that make up these memory units. The existing memory units perform well but they do have the disadvantage of being difficult to miniaturize as it is difficult to both manufacture and assemble the small tubes and wires. Also, as the plated wires are inserted through plastic tubes, it is apparent that the plated wires must have a relatively large diameter to provide the rigidity to allow one to thread the plated wire through the plastic tubes. In addition, these units must be individually made and individually assembled thus greatly increasing the cost of this type of unit. Consequently, there is a need for an inexpensive method of batch manufacturing compact memory units for digital computers.

A number of concepts are being considered for use in production of the memory unit. One concept involves utilizing infinitesimal semiconductor circuits which are deposited on substrate materials such as silicon. Another concept proposes the use of optical methods in which the binary states are registered by color changes in a particular chemical compound. However, the use of magnetic materials in memory units appears to be the best approach at the present time even though there presently are difficulties in manufacturing and assembling memory units.

One of the problems involved in making miniature strips of magnetic material suitable for use in magnetic memories is due to the magnetostatic effect of the varying magnetic substances. Generally, the concept of a magnetic material having a principal magnetic axis is well known in the art; however, within a magnetic material having a preferred magnetic axis, there are magnetic domains in which the local magnetic axis is not in alignment with the principal magnetic axis of the magnetic substance. With relatively large magnetic substances that are in use in some of today's magnetic memories, the magnetic domains do not have an adverse effect on the unit. However, in making magnetic strips for compact miniature memory units these magnetic domains do have an adverse effect on the performance of the magnetic strip in a memory unit.

2

These magnetic domains are primarily a result of magneto-static fields which are produced by discontinuities in the material such as between adjacent crystals or surface imperfections. With the fabrication of magnetic memory strips which may be less than .001" in their widest dimension it is apparent that tiny imperfections such as scratches or grain boundaries can quite readily produce magnetic domains that will render the magnetic strips unsuitable for use in memory units.

The present invention overcomes the problems associated with producing miniature magnetic substances to act as memory units for digital computers through the process of electrodeposition of the magnetic substances to form a digit line. Because a number of digit lines can be simultaneously electrodeposited on the matrix, the present invention eliminates the costly and difficult individual assembly as found in other prior art methods.

SUMMARY OF THE INVENTION

Briefly, the invention comprises a multi-step process of electrodeposition and etching whereby different materials are electrodeposited onto a smooth base member until a network of strips are formed which are then selectively etched to produce the desired digit lines. The digit lines are then bonded to word lines to produce a compact memory plane.

DESCRIPTION OF THE PREFERRED METHOD

Referring to FIGS. 1–19, the step-by-step procedure for making digit lines and memory planes through a process of electrodepositing and etching will now be described in detail.

Figure 1:
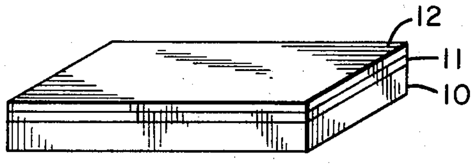
FIGS. 1–19 show the various steps in electrodeposition, etching and bonding to produce a miniature magnetic memory plane.
Figure 2:
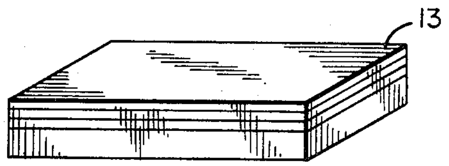
Figure 3:
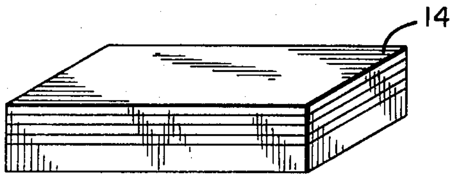

Initially, an operator selects a thick layer of glass 10 to form a rigid flat work base for the subsequent steps of electrodeposition and etching (FIG. 1). Work base 10 is glass, however, it could be other materials as long as the material is rigid and flat so as to allow an operator to handle the work piece without damaging it. Typically, glass 10 may be on the order of .250" thick, however, this is merely an example and no limitation is intended thereto. Next, a smooth, thinner piece of glass 12 which is to form the matrix for the electrodeposition of digit lines is bonded to the thicker base glass 10 by a low temperature wax 11. Typically, glass 12 may be approximately 3 mils thick (no limitation intended thereto) but it should have an optically smooth surface and non-crystalline. The smooth surface is necessary as any imperfections or grain structures appearing in the electrodeposited digit lines will produce stray magnetic fields on the small digit lines. This can readily be appreciated when one realizes that the digit lines may be less than .001" in their widest dimension. In a later step, the base glass 10 is separated from glass 12 by melting the wax thus leaving a thin layer of glass 12 which can be quickly etched away by a suitable etchant such as hydrofluoric acid.

In the next step, glass 12 is cleaned chemically by washing with an alkaline solution. Next, the glass 12 is coated with stannous chloride to provide an affinity of the glass for a conducting base.

In the next step (FIG. 2), after the stannous chloride has been applied to the glass, a thin layer of electrically conductive material 13 is chemically deposited on top of glass 12. Typically, the electrical conducting material may be a layer of silver which is chemically deposited on glass 12. Although a layer of conductive material can be chemically deposited, it will be apparent to those skilled in the art that other techniques such as vacuum depositing could also be used. Silver layer 13 smoothly conforms to glass 12 to provide an electrically conductive base having the same optical smoothness and flatness as glass 12.

Next, electrical leads (not shown) are fastened to silver layer 13 to allow an operator to electrodeposit material onto silver layer 13. In the next step an operator can electrodeposit a gold layer 14 or flash on top of silver layer 13. Gold layer 14 acts as an etchant resist in a later step and also prevents oxidation of the surfaces. Typically, gold layer 14 is relatively thin with a thickness on the order of .000002", however, no limitation is intended thereto.

Figure 4:
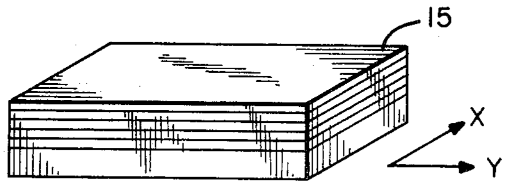
Figure 5:
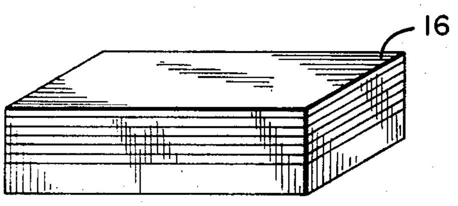
Figure 6:
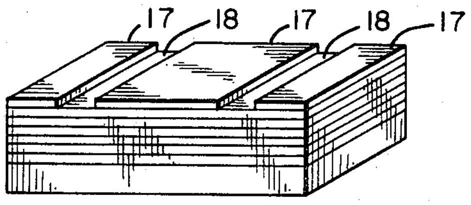

In the next step (FIG. 4), an operator electrodeposits a layer of magnetic material 15 on gold layer 14. Magnetic material 15 may be any one of a variety of materials but a nickel iron alloy having 80% nickel and 20% iron is preferred as it has a minimum of magnetostrictive effects when used in the memory planes. The operator electrodeposits magnetic material 15 in a magnetic field so as to induce a preferred magnetic axis in material 15 which is parallel to the Y axis (FIG. 4). A typical unit for electrodepositing this magnetic strip is shown and described in U.S. Pat. No. 3,649,509 by Peter L. Morawetz and Meryl W. Tinklenberg filed on even date herewith and assigned to the same assignee as the present invention.

In the next step (FIG. 5), an operator may electrodeposit a thin protective gold layer 16 on magnetic material 15 to form a suitable base for applying a resist material and also to prevent unnecessary oxidation of the magnetic material. However, with proper handling this precautionary step is not needed and the resist could be applied directly on top of magnetic material 15.

In the next step (FIG. 6), an operator outlines a digit line pattern having a number of channels 18 located in resist material 17. Typically, the digit line pattern may have a U-shaped appearance and have as many as 500 lines per inch. However, no limitation is intended thereto. For purposes of illustration, only two channels are shown in the memory unit. Obviously, the more digit lines per inch the smaller the digit lines and the more bits of information that can be stored in a given volume.

After the suitable digit line pattern has been formed in etchant resist, an operator electrodeposits a conductive layer 20 in channels 18. A number of different materials could be used, however, copper is preferred as it deposits evenly, is a good conductor and also deposits with a smooth, fine finish suitable for receiving a layer of magnetic material without upsetting the preferred magnetic axis of the material.

Figure 7:
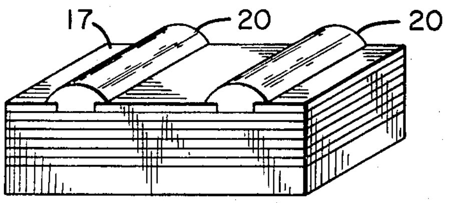
Figure 8:
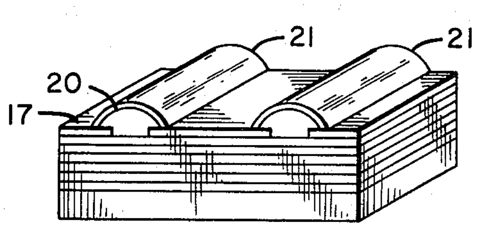
Figure 9:
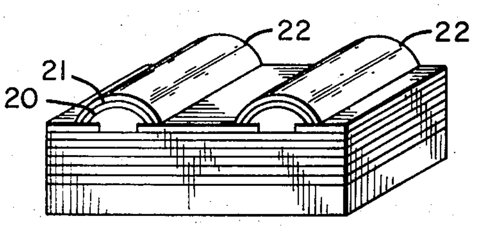
Figure 10:
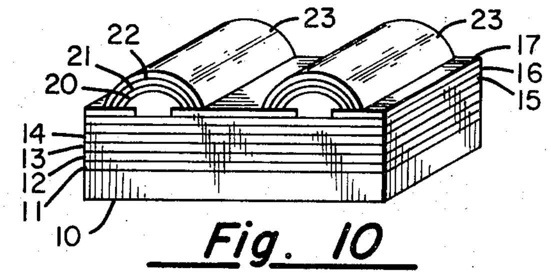
Figure 11:
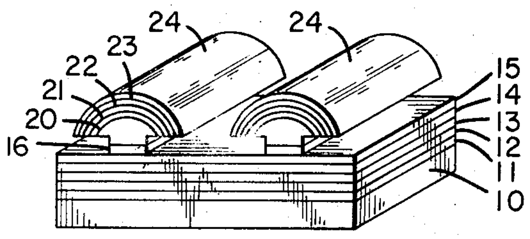

FIG. 7 shows two of the copper lines 20 that form the center core of the digit lines.

In the next step (FIG. 8), an operator can, if desired, electrodeposit a thin gold layer 21 over copper lines 20 to prevent any oxidation of the exposed copper if there should be a long delay before the electrodeposition is completed.

In the next step (FIG. 9), an operator electrodeposits a layer of magnetic material 22 over gold layer 21 and copper lines 20. Because of the preferred magnetic direction of magnetic layer 15 being parallel to the Y axis the layer of magnetic material 22 plates with a preferred magnetic direction that is also parallel to the Y axis.

This ensures that the digit lines of the memory plane have a preferred direction of magnetism that is circumferential rather than longitudinal to the digit line.

In the next step (FIG. 10), an operator can electrodeposit a thin gold layer 23 or flash over the exposed magnetic material 22 to act as a resist for further etching steps.

In the next step (FIG. 11), an operator can electrodeposit a layer of resist 24, which may be magnetic material, over gold layer 23 to act as an etchant resist during the selected etching of gold layer 16 from between the various digit lines. It will be apparent that if the gold layer 16 was not electrodeposited thereon it would not be necessary to provide the additional steps of electrodepositing resist layer 24 to allow an operator to selectively etch between the digit lines. Also, the operator removes etchant resist 17 to allow him to etch away the gold layer 16 between the digit lines. In the next step (FIG. 11), the operator etches away the exposed portions of gold layer 16 with a suitable etchant such as potassium cyanide.

Figure 12:
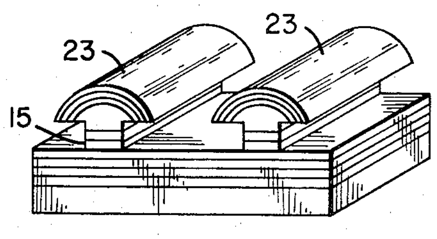
Figure 13:
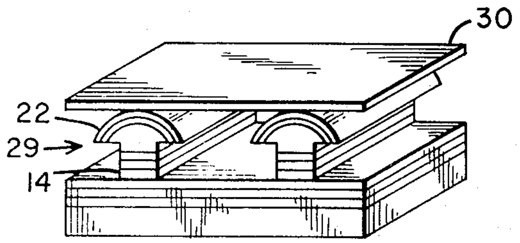
Figure 14:
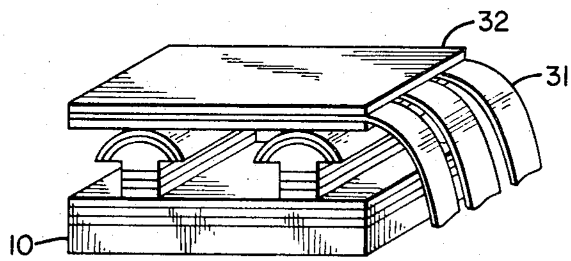

In the next step (FIG. 12), the operator applies a suitable etchant such as ferric chloride to etch away the exposed portions of magnetic material 24 and 15 thus leaving the configuration shown in FIG. 12.

In the next step, an operator applies an etchant to remove the exposed portions of gold layer 23 and gold layer 14. This completes the formation of digit lines 29, however, in order to assemble the digit lines in a memory plane, a set of word lines must be bonded to the digit lines before they are removed from supporting glass base 10.

In order to bond the word lines to the digit lines (FIG. 13), a thin layer insulating material 30, such as "Mylar" (polyethylene terephthalate) is placed on top of digit lines 29 and is bonded thereto through a suitable polyester resin. The polyester resins are preferred because they are relatively thin and form a firm bond. A set of word lines 31 are then placed perpendicular to the longitudinal direction of the digit lines 29 and bonded thereto through a suitable polyester resin. Word lines 31 comprise a number of conducting strips which are preferably made from copper. Word line set 31 extends beyond the lateral edge of digit lines 29 sufficiently far so as to allow word line set 31 to be bonded to the bottom of digit lines 29 when the supporting base plate 10 is removed. Although word line set 31 is shown as being suitable for folding over the digit lines, it is apparent that the word lines could be connected by a separate grounding line rather than folding the word lines over on the opposite side as shown in the drawings.

Next, an operator bonds a second layer of insulating material 32, such as "Mylar," to the top of the set of word lines 31. This forms a rigid base that holds the digit lines.

Figures 15, 16:
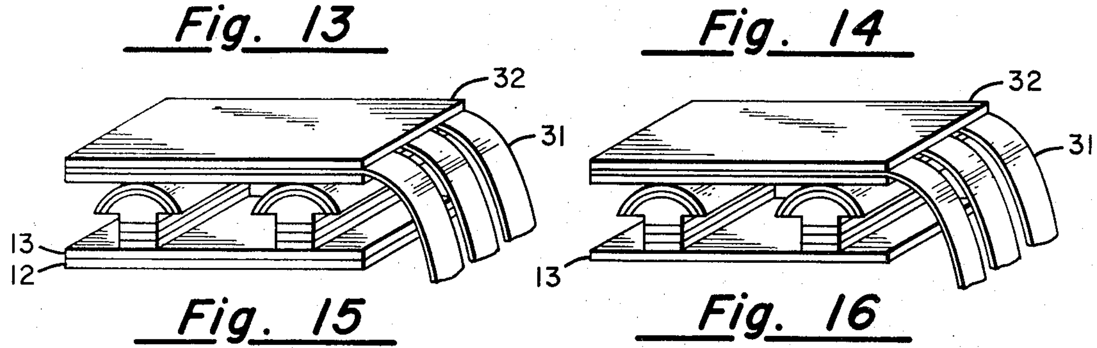
Figure 17:
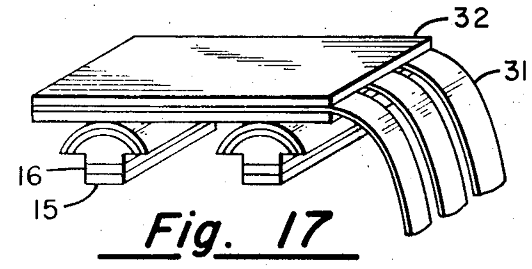
Figure 18:
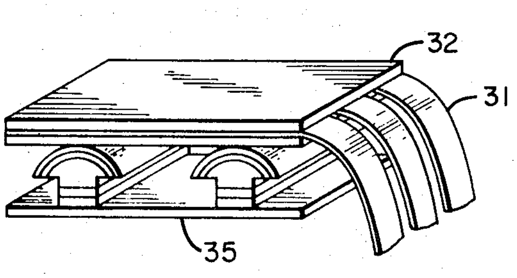
Figure 19:
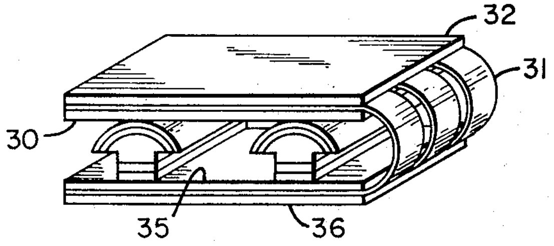

After word line set 32 has been bonded to the top of digit line 29, the base glass 10 is heated slightly to melt the low temperature wax 11 between base glass 10 and glass layer 12. When wax 11 melts it releases glass base 10 from thin glass layer 12 thus allowing the operator to remove glass base 10 (FIG. 15). After glass base 10 is removed, the thin glass layer 12 is etched away with a suitable etchant such as hydrofluoric acid (FIG. 16).

In the next step (FIG. 17), conducting layer 13, which in the described method is silver, can be etched away with a suitable etchant such as hypoferro cyanide. Also, gold layer or flash 14 can now be etched away.

In the next step (FIG. 18), an operator bonds a suitable layer of insulating material 35 (such as Mylar) on the bottom of digit lines 29 with a suitable bonding material such as a polyester resin.

Next (FIG. 19), the operator folds word line set 31 over the insulating material 35 and bonds word line set 31 thereto with a suitable material as mentioned previously. Next, the operator bonds a second layer of insulating material 36 to the bottom of word line set 31 thus completing the fabrication of a memory plane. This completes the detail step-by-step preparation of a memory plane wherein the digit lines are formed through a selective process of electrodeposition and etching.

The electrodeposition of the magnetic material with a preferred magnetic axis is typically accomplished in a magnetic field produced by Helmholtz coils. This type of electrodeposition is more fully described in the aforementioned co-pending application of Tinklenberg and Morawetz.

We claim:

1. The method of forming a set of magnetic strips suitable for use in a magnetic memory device comprising the successive steps of:

(a) temporarily mounting an optically smooth surfaced noncrystalline glass base onto a rigid and flat main base;

(b) cleaning and coating the glass base with a material suitable to provide an affinity for an electrically conducting layer;

(c) coating the glass base with an electrically conductive material;

(d) electrodepositing a first layer of magnetic material on the glass base in the presence of a magnetic field so as to produce a preferred magnetic axis in said magnetic material;

(e) forming a line pattern on the surface of said first layer of magnetic material by electrodepositing a conductive material in a series of strips thereon;

(f) electrodepositing a second magnetic material on said line pattern in the presence of a magnetic field so as to produce a preferred magnetic axis in said second layer of magnetic material in generally the same direction as said first layer; and (g) removing said main base and said glass base leaving said magnetic strips and line pattern.

2. The method of claim 1 in which said optically smooth surfaced noncrystalline glass base is bonded to the flat main base by means of a low temperature wax.

3. The method of claim 1 including after step (c) but before step (d) the step of coating gold onto the layer of electrically conductive material to serve as an etchant resist, and in which step (e) comprises the substeps of applying a layer of etchant resist material on the first layer of magnetic material, said etchant resist having a number of open channels therein corresponding to said line pattern and electrodepositing a conductive material in the channels to form said series of strips, and after step (f) but before step (g) coating a thin layer of gold over the second layer of magnetic material followed by a thin third layer of magnetic material to serve as a resist, removing said etchant resist, etching away the third and first layer of magnetic resist material which is not covered by said line pattern and etching away the gold layer.

4. The method of forming a set of magnetic strips suitable for use in a magnetic memory device comprising the successive steps of:

(a) bonding an optically smooth surfaced noncrystalline glass base onto a rigid and flat main base with a low temperature wax;

(b) cleaning the glass base and coating the glass base with a material suitable to provide an affinity for an electrically conducting layer;

(c) coating the glass base with a layer of electrically conducting silver having the same optical smoothness and flatness as the glass base;

(d) covering said silver layer with a gold flash layer to act as an etchant resist and prevent surface oxidation;

(e) electrodepositing a first layer of magnetic material on the gold flash in the presence of a magnetic field so as to produce a preferred magnetic axis in said magnetic material;

(f) forming a line pattern on the surface of said first layer of magnetic material by coating thereon a layer of resist with a plurality of channels therein and electrodepositing a second conductive material in the channels to form a series of strips in said channels;

(g) electrodepositing a second magnetic material on said line pattern on said second conductive material in the presence of a magnetic field so as to produce a preferred magnetic axis in said second layer of magnetic material in generally the same direction as said first layer;

(h) electrodepositing a layer of gold over said second layer of magnetic material;

(i) coating a layer of magnetic resist material over the gold layer on the second magnetic material;

(j) removing the resist material used to define said channels on the first layer of magnetic material;

(k) etching away the magnetic resist material of step (i) and the magnetic material in said first layer which is not covered by the second conductive material in said line pattern; and (l) etching away the gold layer over the second layer of magnetic material and the gold flash on the silver layer which is not covered by said line pattern.

5. The method of claim 4 including the additional steps of bonding a set of word lines between a pair of insulating layers and positioning said word lines generally transverse to the lines of said line pattern and bonding the word lines to said line pattern to form a memory plane.

References Cited

UNITED STATES PATENTS

| | | | |
|---|---|---|---|
| 3,500,356 | 3/1970 | Feissel | 340—174 |
| 3,622,469 | 11/1971 | Alberts | 204—15 |
| 3,575,824 | 4/1971 | Eide | 204—15 |
| 3,375,503 | 3/1968 | Bertelsen | 340—174 |
| 3,666,635 | 5/1972 | Oshima et al. | 204—15 |

THOMAS TUFARIELLO, Primary Examiner

U.S. Cl. X.R.

29—627; 204—15; 340—174 TF